(12) United States Patent
Li

(10) Patent No.: US 12,176,837 B2
(45) Date of Patent: Dec. 24, 2024

(54) MOTOR FLYING START USING FIELD WEAKENING CONTROL

(71) Applicant: Rockwell Automation Technologies, Inc., Mayfield Heights, OH (US)

(72) Inventor: Bing Li, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 189 days.

(21) Appl. No.: 18/065,170

(22) Filed: Dec. 13, 2022

(65) Prior Publication Data
US 2024/0195339 A1 Jun. 13, 2024

(51) Int. Cl.
| | |
|---|---|
| *H02M 7/5375* | (2006.01) |
| *H02P 21/14* | (2016.01) |
| *H02P 21/18* | (2016.01) |
| *H02P 21/34* | (2016.01) |
| *H02P 25/024* | (2016.01) |
| *H02P 25/092* | (2016.01) |
| *H02P 27/06* | (2006.01) |

(52) U.S. Cl.
CPC ............ *H02P 27/06* (2013.01); *H02P 21/141* (2013.01); *H02P 21/18* (2016.02); *H02P 21/34* (2016.02); *H02P 25/024* (2016.02); *H02P 25/092* (2016.02); *H02P 2201/01* (2013.01); *H02P 2207/01* (2013.01)

(58) Field of Classification Search
CPC ........ H02P 27/06; H02P 21/141; H02P 21/18; H02P 21/34; H02P 25/024; H02P 25/092; H02P 2201/01; H02P 2207/01; H02P 1/029; H02P 21/22; H02P 21/26; H02P 21/0089

See application file for complete search history.

(56) References Cited

U.S. PATENT DOCUMENTS

| | | | |
|---|---|---|---|
| 8,324,851 B2 | 12/2012 | Matsuo et al. | |
| 9,369,073 B1 | 6/2016 | Tian | |
| 9,762,155 B1 | 9/2017 | Magee et al. | |
| 10,243,499 B2 | 3/2019 | Park | |

(Continued)

FOREIGN PATENT DOCUMENTS

CN 111327234 A 6/2020

OTHER PUBLICATIONS

Zih-Cing You et al., "A Restarting Strategy for Back-EMF-Based Sensorless Permanent Magnet Synchronous Machine Drive", Energies 2019, 12, 1818; doi:10.3390/en12091818, www.mdpi.com/journal/energies, 16 pages.

(Continued)

*Primary Examiner* — Muhammad S Islam

(57) ABSTRACT

A method for flying start control of a motor, a computer readable medium, and a power conversion system having an inverter and a controller configured by computer executable instructions in a memory to perform flying start of a rotating motor by field weakening control to control the motor responsive to the motor speed exceeding the rated speed or other non-zero threshold at startup of the power conversion system. The method includes measuring a motor speed of a motor, responsive to startup of a power conversion system, and performing a flying start operation using field weakening control to control the motor responsive to the motor speed exceeding a non-zero threshold at startup of the power conversion system.

20 Claims, 6 Drawing Sheets

(56) References Cited

U.S. PATENT DOCUMENTS

| | | |
|---|---|---|
| 11,502,636 B1 | 11/2022 | Li et al. |
| 2016/0248353 A1 | 8/2016 | Ungermann et al. |
| 2017/0302209 A1* | 10/2017 | Royak ................... H02P 23/14 |
| 2020/0389108 A1 | 12/2020 | Yajurvedi et al. |

OTHER PUBLICATIONS

Luka Pravica et al., "Flying Start of a Permanent Magnet Wind Power Generator Based on a Discontinuous Converter Operation Mode and a Phase-Locked Loop", IEEE Transactions on Industrial electronics, vol. 65, No. 2, Feb. 2018, 10 pages.

Kyoung-Min Choo et al., "Flying Start of Permanent Magnet Synchronous Machine Drives based on Variable Virtual Resistance", IEEE Transactions on Industrial Electronics, downloaded on Mar. 31, 2021, 10 pages.

European Search Report in EP23214242.2, mailed May 6, 2024, 9 pages.

Kim, SH. "High-speed operation of alternating current motors," in: Electric Motor Control: DC, AC, and BLDC Motors, Elsevier, 2017, pp. 341-371.

Nalepa R, Orlowska-Kowalska T. Optimum trajectory control of the current vector of a nonsalient-pole PMSM in the field-weakening region. IEEE transactions on industrial electronics. Feb. 17, 2011;59(7):2867-76.

Taniguchi S, Yasui K, Yuki K, Nakazawa Y, Onda S. A restart control method for position sensorless PMSM drive systems without potential transformer for railway vehicle traction. Electrical Engineering in Japan. Nov. 2015;193(3):44-53.

\* cited by examiner

MOTOR FLYING START USING FIELD WEAKENING CONTROL

BACKGROUND INFORMATION

The subject matter disclosed herein relates to power converters.

BRIEF DESCRIPTION

In one aspect, a power conversion system includes an inverter configured to convert DC power to AC power to drive a motor, and a controller, configured to operate the inverter to perform a flying start operation using field weakening control responsive to a motor speed of the motor exceeding a non-zero threshold at startup of the power conversion system.

In another aspect, a method includes measuring a motor speed of a motor, responsive to startup of a power conversion system, and performing a flying start operation using field weakening control to control the motor responsive to the motor speed exceeding a non-zero threshold at startup of the power conversion system.

In a further aspect, a non-transitory computer readable medium has computer executable instructions which, when executed by a processor, cause the processor to measure a motor speed of a motor, responsive to startup of a power conversion system, and perform a flying start operation using field weakening control to control the motor responsive to the motor speed exceeding a non-zero threshold at startup of the power conversion system.

DETAILED DESCRIPTION

Figure 1:
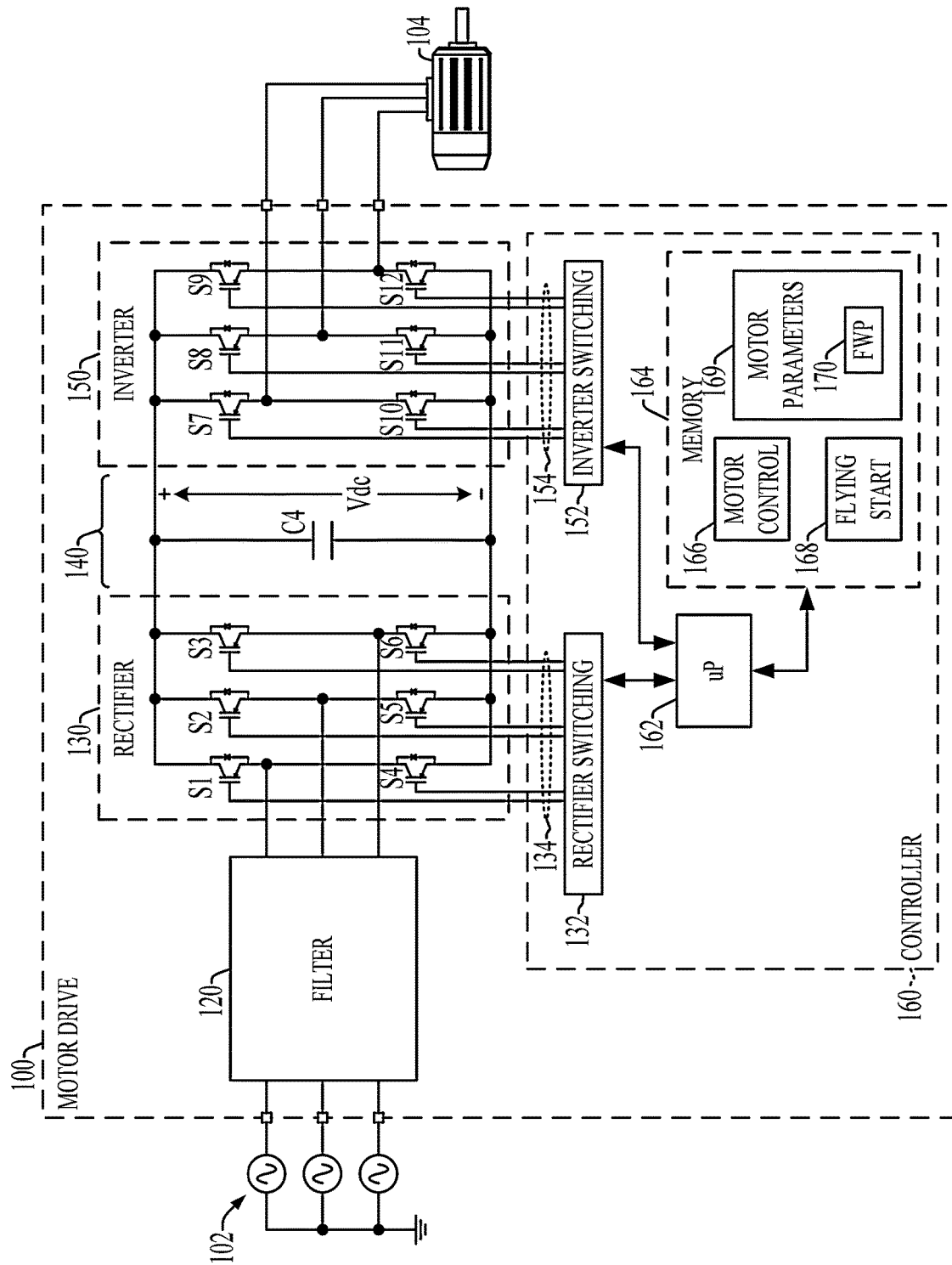
FIG. 1 is a schematic diagram of a motor drive power conversion system.

Referring now to the figures, several embodiments or implementations are hereinafter described in conjunction with the drawings, wherein like reference numerals are used to refer to like elements throughout, and various features are not necessarily drawn to scale. Flying start operation of a motor is difficult in some circumstances, such as for induction motors (IMs) or synchronous reluctance motors (SynRM) that may be rotating at or above a rated speed. Attempting volts Hz matching at these motor speeds without field weakening control can cause excess current draw and/or high voltage spikes and lead to overcurrent or overvoltage trips in a motor drive. Described examples provide solutions as methods, power conversion systems, and computer readable mediums for implementing flying start of a rotating motor by field weakening control to control the motor in response to the motor speed exceeding the rated speed or other non-zero threshold at startup of the power conversion system. Example implementations mitigate or avoid unwanted overvoltage or overcurrent trips without adding components or cost to motor drive power conversion systems to provide a solution that can help enable reliable flying start operation for motors spinning at high speeds upon startup of the motor drive.

Flying start capabilities can be useful in a variety of applications, such as motor drives configured to drive outdoor fans or pumps in wells. In these applications, the blades of a driven fan or pump may rotate when the drive is turned off, due to ambient wind near an outdoor fan or flow of a pumped fluid in a well. Starting a drive when the rotor of the driven motor is rotating is referred to as a flying start and may result in high current spikes in the drive. Prior to actively driving the motor, the rotor shaft speed and position (e.g., angle) can be measured, and volts hertz matching is performed to match the drive output voltage and speed to the respective CEMF and rotor rotation to mitigate or avoid high current spikes when active driving of the rotating motor begins.

Figure 1A:
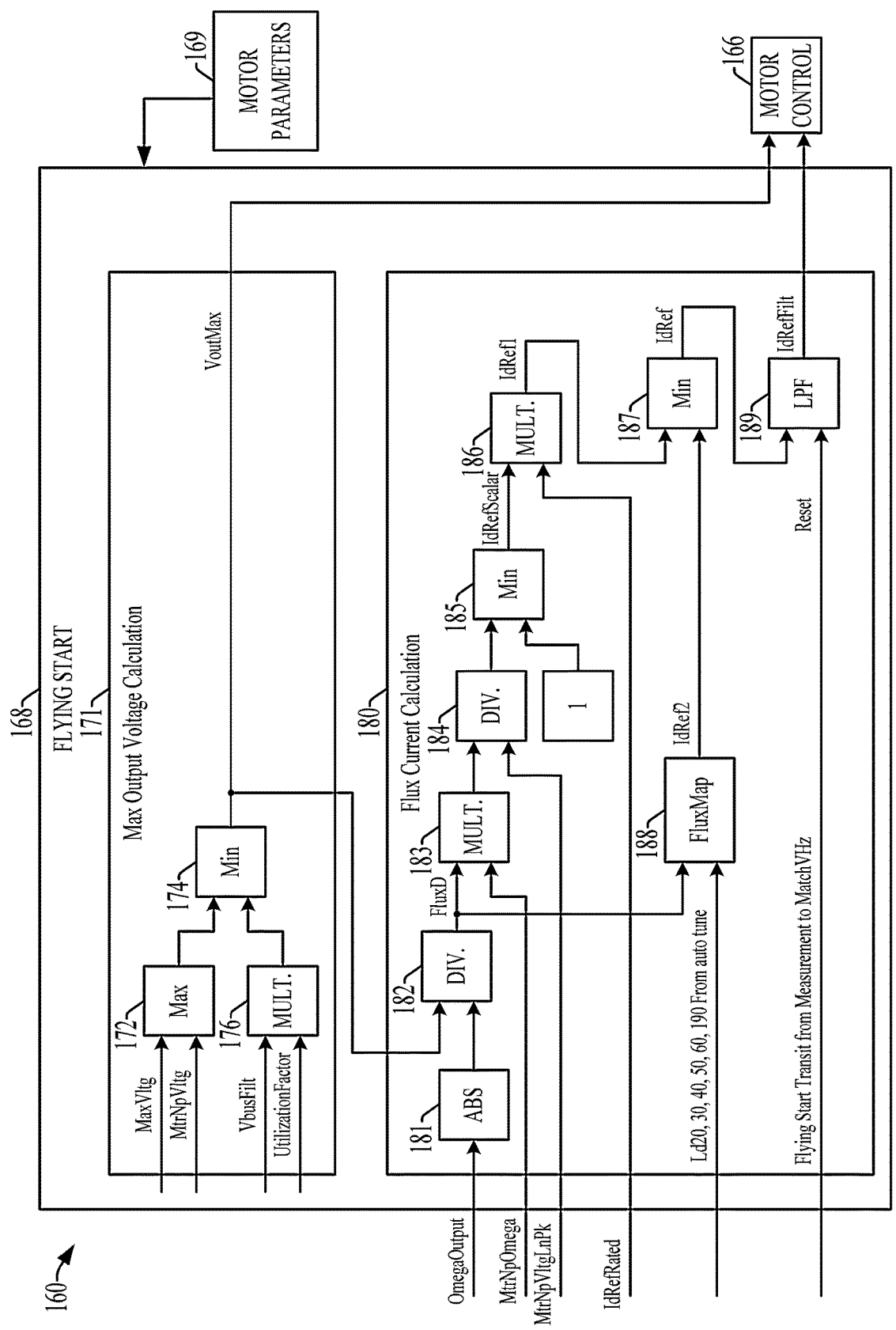
FIG. 1A is a schematic diagram of a flying start component.
Figure 1B:
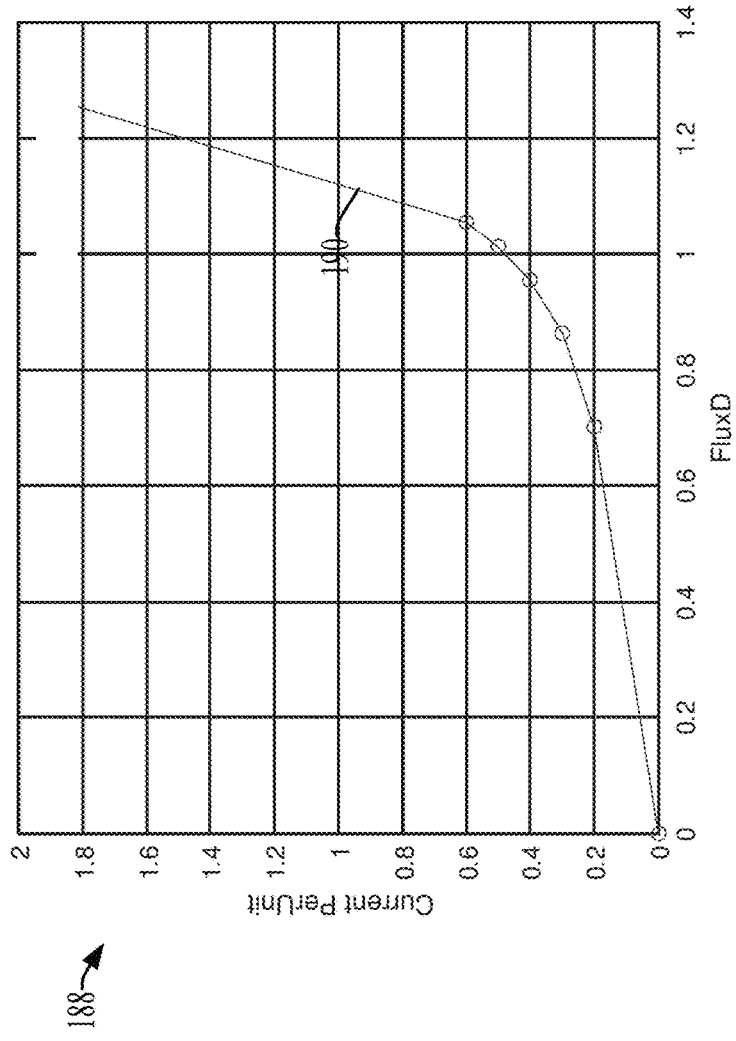
FIG. 1B is a graph of a flux map.
Figure 1C:
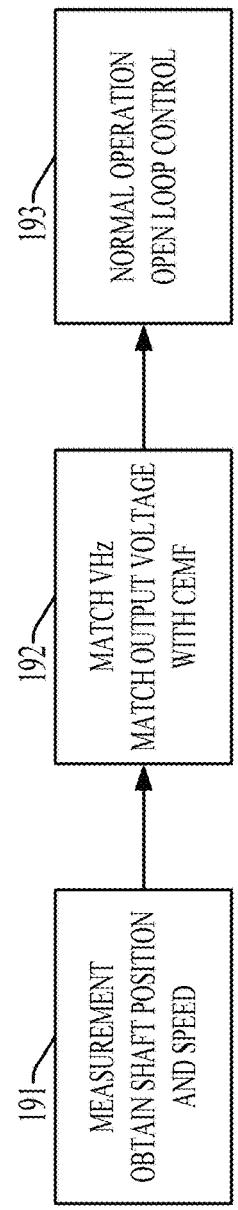
FIG. 1C shows three flying start states.

Referring initially to FIGS. 1-1C, FIG. 1 shows an example electrical system with a motor drive power conversion system 100 that converts electrical power from an external power source 102 to drive a motor load 104. FIG. 1C shows three flying start states 191, 192, and 193 implemented by the motor drive power conversion system 100 in one example, including a first state 191 for measurement including obtaining motor shaft position and speed, a second state 192 for matching volts and hertz to match the drive output voltage and frequency with motor CEMF and speed, and a third state 193 for normal operation with open loop control. In one example, the motor 104 is an induction motor. In another example, the motor 104 is a synchronous reluctance motor. In one example, the motor drive power conversion system 100 is part of a fan system, where the motor 104 drives a fan, such as for environmental control of a building (e.g., heating and/or air conditioning). In another example the motor drive power conversion system 100 is part of a pump system, in which the motor 104 drives a pump that pumps a fluid in an industrial facility or at a well or mine.

The system 100 in one example implements intelligent flying starts by field weakening control in responsive to the motor speed exceeding a non-zero threshold at startup of the power conversion system 100, and the system ramps the drive output voltage and frequency to match the CEMF of the rotating motor and eventually resumes or starts normal operation without causing current spikes or tripping the drive. The example flying start apparatus and techniques can be used to start a rotating motor and resume normal operation as quick as possible, with a minimal impact on load or speed for a variety of applications such as fan/pump systems.

The motor drive power conversion system 100 receives single or multiphase AC input power from the external power source 102. The illustrated example receives a three-phase input. In other examples, single phase or other multiphase embodiments are possible. The motor drive 100 converts input power from the source 102 to deliver output power to drive the motor load 104. The motor drive 100 includes a three-phase input filter circuit 120, such as an LC or LCL filter. The motor drive 100 also includes a rectifier 130, a DC bus or DC link circuit 140, and an output inverter 150.

The rectifier 130 and the inverter 150 are operated by a controller 160. The controller 160 includes a processor 162, an electronic memory 164 or other non-transitory computer readable medium that stores data and program instructions, as well as a rectifier controller 132 and an inverter controller 152. The processor 162 in one example includes an internal electronic memory (not shown) that stores data values and provides a non-transitory computer-readable medium that stores computer-executable instructions which, when executed by the processor 162, cause the processor 162 to implement the various functions and features described herein. In another example, the memory 164 is external to the processor 162 and the memory 164 stores data values and provides a non-transitory computer-readable medium that stores computer-executable instructions which, when executed by the processor 162, cause the processor 162 to implement the various functions and features described herein. The controller 160 and the components thereof may be implemented as any suitable hardware, processor-executed software, processor-executed firmware, logic, and/or combinations thereof wherein the illustrated controller 160 can be implemented in processor-executed software or firmware providing various control functions by which the controller 160 receives feedback and/or input signals and/or values (e.g., setpoint(s)) and provides rectifier and inverter switching control signals 134 and 154 to operate switching devices S1-S6 of the rectifier 130 and switches S7-S12 of the inverter 150 to convert input power for providing AC output power to drive the motor 104. In addition, the controller 160 and the components 132, 152 thereof can be implemented in a single processor-based device, such as a microprocessor, microcontroller, FPGA, etc., or one or more of these can be separately implemented in unitary or distributed fashion by two or more processor devices.

The motor drive 100 in one example provides an active front end (AFE) including a switching rectifier (also referred to as a converter) 130 receiving three-phase power from the source 102 through the filter circuit 120. The active rectifier 130 includes rectifier switches S1-S6, which may be insulated gate bipolar transistors (IGBTs) or other suitable form of semiconductor-based switching devices operable according to a corresponding rectifier switching control signal 134 to selectively conduct current when actuated. In addition, diodes are connected across the individual IGBTs S1-S6. In operation, switching of the rectifier switches S1-S6 is controlled according to pulse width modulated rectifier switching control signals 134 from the rectifier switching controller 132 to provide active rectification of the AC input power from the source 102 to provide a DC bus voltage Vdc across a DC bus capacitor C4 in the DC link circuit 140.

The inverter 150 includes switches S7-S12 coupled to receive power from the DC bus 140 and to provide AC output power to the motor 104. The inverter switches S7-S12 can be any form of suitable high-speed switching devices, including without limitation IGBTs that operate according to switching control signals 154 from the inverter switching control component 152 of the drive controller 160. The individual inverter switching devices S7-S12 selectively couple a respective AC node of the inverter output with a respective one of first and second DC nodes of the DC bus circuit 140 according to a respective inverter switching control signal 154. In certain examples, the controller 160 receives various input signals or values, including setpoint signals or values for desired output operation, such as motor speed, position, torque, etc., as well as feedback signals or values representing operational values of various portions of the motor drive 100 and electrical system components of the drive 100. In addition, the controller 160 in certain examples receives one or more voltage and/or current feedback signals or values from sensors to indicate the DC bus voltage Vdc, line to line AC input voltage values, motor line to line voltage values and/or currents, etc.

The memory 164 stores motor control program instructions 166, such as speed control, torque control, etc., for normal operation, as well as flying start program instructions 168 and motor parameters 169 that include a non-zero threshold 170, for example, the rated speed of the motor 104. The motor parameters 169 includes stored parameters associated with operation of the motor drive 100, such as drive configuration parameters. The controller 160 is configured by the executable instructions 166, 168 to operate the inverter 150 to perform a flying start operation using field weakening control in response to a motor speed of the motor 104 exceeding the non-zero threshold 170 at startup of the power conversion system 100.

FIG. 1A schematically illustrates a non-limiting example implementation of the flying start program instructions 168 in the controller memory 164 of FIG. 1, including a maximum output voltage calculation component 171 and a flux current calculation component 180. The controller 160 is configured to execute the instructions of the maximum output voltage calculation component 171 to calculate (e.g., compute or otherwise determine) a maximum output voltage VoutMax of the inverter 150, for example, representing the maximum voltage that the drive 100 can output. The controller 160 is configured to execute the instructions of the flux current calculation component 180 to calculate (e.g., compute or otherwise determine) a d-axis current reference IdRefFilt based on the calculated maximum output voltage VoutMax. In one implementation, the calculated d-axis current reference IdRefFilt and the calculated maximum output voltage VoutMax are provided to the motor control component 166 which is also executed by the processor 162 of the controller 160. The controller 160 executes instructions of the flying start component 168 in one example to perform a flying start operation including a field weakening control operation based on the calculated d-axis current reference IdRefFilt.

The execution or implementation of the components 171 and 180 in one example is based at least partially on one or more of the motor parameters 169 stored in the controller memory 164. The maximum output voltage calculation component 171 in one example includes a maximum component 172 that determines a maximum one of a maximum voltage parameter value Max Vltg, for example, corresponding to a maximum voltage that the inverter 150 can output, and a maximum motor nameplate voltage value MtrNpVltg, for example, corresponding to a nameplate voltage of the motor 104, which values are stored as motor parameters 169 in the controller memory 164.

The maximum output voltage calculation component 171 in this example also includes a minimum component 174 that outputs the calculated maximum output voltage VoutMax as the lesser of the value output by the maximum component 172 and the output from a multiplier component 176. The multiplier component 176 multiplies a filtered DC bus voltage value VbusFilt, corresponding to the DC bus voltage Vdc across the DC bus capacitor C4 in the DC link circuit 140, by a utilization factor value UtilizationFactor to provide the second input to the minimum component 174. The bus utilization factor in one example is approximately 0.95, although other values can be used. The minimum component 174 calculates the maximum output voltage VoutMax as the lesser of the values from the maximum component 172 and the multiplier component 176.

The flux current calculation component 180 calculates (e.g., computes or otherwise determines) the d-axis current reference IdRefFilt based on the calculated maximum output voltage VoutMax from the maximum output voltage calculation component 171 and based on other motor or drive parameters 169. The field weakening motor control during flying start operations is controlled at least partially based on the flux current calculated by the flux current calculation component 180, for example, such that if the motor speed is too high (e.g., higher than rated speed), the controller 160 will reduce the flux current during field weakening operation. The flux current calculation component 180 calculates includes an absolute value (ABS) component 181 that outputs the absolute value of a motor speed value OmegaOutput (e.g., corresponding to the measured speed of the motor 104). A divider component 182 divides the calculated maximum output voltage VoutMax by the absolute value of the motor speed to calculate a d-axis flux value FluxD.

A multiplier component 183 multiplies the calculated d-axis flux value FluxD by a motor nameplate speed value MtrNpOmega (e.g., stored in the motor or drive parameters 169). The product of these values is provided as an input to a divider component 184 and is divided by a peak line to neutral motor nameplate voltage value MtrNpVltgLnPk (e.g., stored in the motor or drive parameters 169). The result is provided to a minimum component 185, which outputs the lesser of the output of the divider component 184 and the value 1 as a d-axis reference current scalar IdRefScalar. A multiplier component 186 multiplies a rated d-axis reference current value IdRefRated (e.g., a rated flux current value stored in the motor or drive parameters 169) by the d-axis reference current scalar IdRefScalar to calculate a first d-axis current reference IdRef1 based on the calculated maximum output voltage VoutMax and the rated d-axis current reference IdRefRated. The first d-axis current reference IdRef1 in this example is calculated based on the motor nameplate data (e.g., nameplate speed, voltage) and rated flux current stored in the motor or drive parameters 169 of the controller memory 164 to provide an approximation of the flux current of the motor during field weakening control for flying start operation. In one example, the controller 160 uses the first d-axis current reference IdRef1 for controlling the motor 104 during field weakening operation in response to the measured motor speed (e.g., motor speed value OmegaOutput) exceeding the threshold 170 at startup.

The flux current calculation component 180 in one example also includes a minimum component 187 that outputs the minimum or lower of the first d-axis current reference IdRef1 and a second d-axis current reference IdRef2 from a flux map component 188. The flux map 188 in one example is a parametric equation with parameters stored in the controller memory 164 to define a relationship between per unit current and d-axis flux in the motor 104. In this example, the controller 160 evaluates the parametric equation based on the calculated d-axis flux FluxD from the divider component 182 to calculate the second d-axis current reference IdRef2 based on the calculated d-axis flux FluxD and the flux map 188 equation.

In another implementation, the flux map 188 is implemented as a lookup table with entries stored in the controller memory 164. FIG. 1B shows one example flux map 188 with a curve 190 that is modeled and stored in the controller memory 164 as parameters of a parametric equation that can be solved by the processor 162 for d-axis current as a function of the calculated d-axis flux FluxD, or as a lookup table with entries and values (e.g., values Ld20, 30, 40, 50, 60, 190 From auto tune as shown in FIG. 1A, and indicated by circles on the curve 190 of FIG. 1B) that are stored in the memory 164. As a lookup table, the flux map 188 helps the processor 162 to determine the second d-axis current reference IdRef2 based on the calculated d-axis flux FluxD, for example, using interpolation or other suitable computational technique or approach. In one implementation, the controller 160 uses the second d-axis current reference IdRef2 to control the motor 104 during field weakening operation in response to the measured motor speed (e.g., motor speed value OmegaOutput) exceeding the threshold 170 at startup.

In the illustrated example, the flux current calculation component 180 also includes a minimum component 187 that computes a d-axis reference current IdRef as the minimum or smaller one of the respective first and second d-axis current references IdRef1 and IdRef2. In one implementation, the controller 160 uses the d-axis reference current IdRef to control the motor 104 during field weakening operation in response to the measured motor speed exceeding the threshold 170 at startup.

In the illustrated example, the flux current calculation component 180 also includes a low pass filter component 189 that filters the calculated d-axis current reference IdRef to compute a filtered d-axis current reference IdRefFilt. The controller 160 in one example uses the filtered d-axis current reference IdRefFilt to control the motor 104 during field weakening operation in response to the measured motor speed exceeding the threshold 170 at startup. In another example, the flux current calculation component 180 includes the low pass filter component 189 that filters one of the respective first and second d-axis current references IdRef1 and IdRef2 to compute the filtered d-axis current reference IdRefFilt, and the controller 160 in one example performs the field weakening control operation based on the computed filtered d-axis current reference IdRefFilt to control the motor 104 during field weakening operation in response to the measured motor speed exceeding the threshold 170 at startup. The low pass filter 189 in one example has a reset input that receives an input signal Reset to selectively enable the filter 189 in response to a Flying Start Transit from Measurement to MatchVHz state from the motor control component 166 or from a startup procedure implemented by the controller 160.

Referring also to FIGS. 2-5, FIG. 2 shows a method 200 implemented by the controller 160 for flying start of the motor 104, for example, by the processor 162 executing the flying start program instructions 168 stored in the memory 164. The motor drive power conversion system 100 is started at 202, for example, by a user or by a system component (e.g., a thermostat determining that fan cooling is needed, etc.), or an automatic restart following system power interruption, etc.

Figure 2:
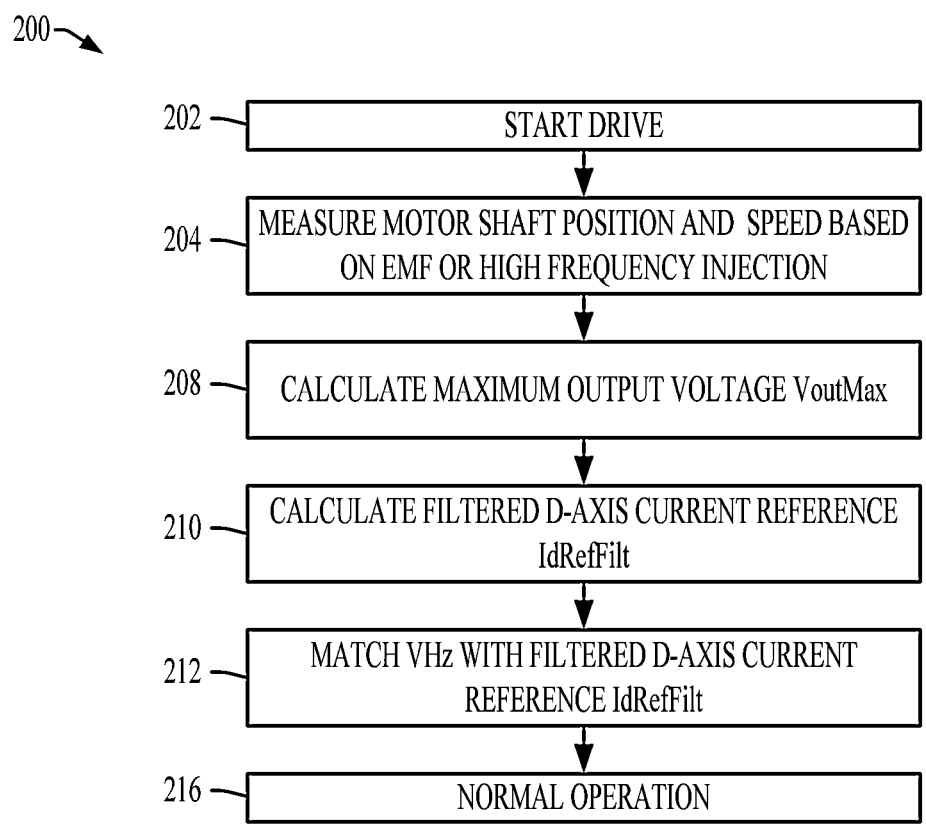
FIG. 2 is a flow diagram of a method.

In response to startup of the system 100 at 204 in FIG. 2, the controller 160 measures the motor shaft position and motor speed of the motor 104 and if the measured rotor speed is low, the rated flux current will be applied due to the input of the value 1 to the Min block 185 in FIG. 1A.

The controller 160 performs a flying start operation at 208, 210 and 212 using field weakening control to control the motor 104. At 208, the controller 160 calculates the maximum output voltage VoutMax of the inverter 150, for example, by implementing the maximum output voltage calculation component 171 as described above in connection with FIG. 1A. At 210, the controller 160 calculates the d-axis current reference (e.g., IdRef, IdRefFilt, IdRef1, IdRef2) based on the calculated maximum output voltage VoutMax, for example, by implementing the flux current calculation component 180 of FIG. 1A as described above. At 212, the controller 160 performs the voltage frequency (e.g., VHz) matching control operation based on the calculated d-axis current reference. Thereafter, the controller 160 transfers to normal operation at 216, for example, generating the inverter switching control signals 154 to implement speed or torque control as commanded.

Figure 3:
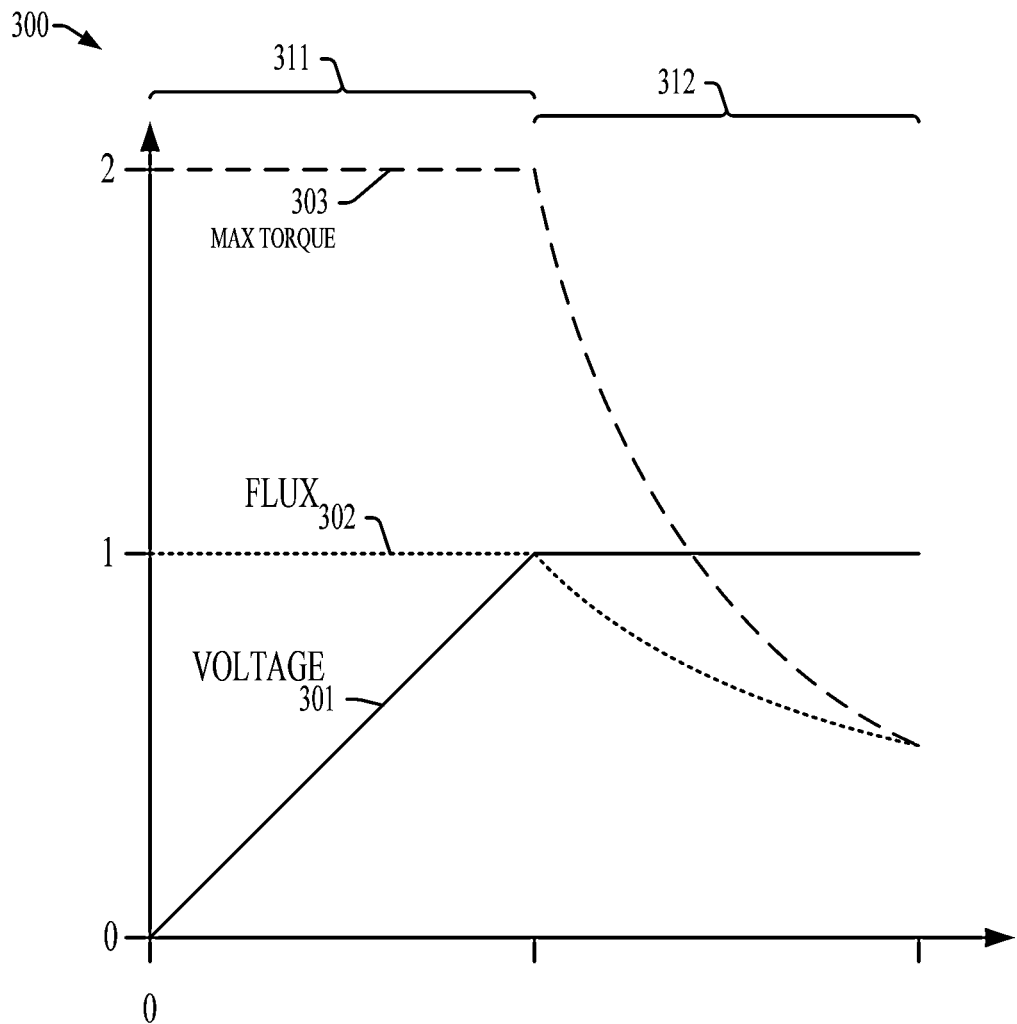
FIG. 3 is a graph.

FIG. 3 shows a graph 300 illustrating normal and field weakening control of the motor 104, including a curve 301 showing the motor voltage, a curve 302 showing the motor flux (e.g., stator flux ys), and a curve 303 showing the maximum torque (e.g., T) of the motor 104 in a first speed range 311 below and at the field weakening point FWP (e.g., the threshold 170 at the rated speed in one implementation), and a second range 312 for motor speeds that exceed the threshold field weakening point FWP. In the first range 311 in one example, the controller 160 operates in normal operation (e.g., 216 in FIG. 2) with motor flux (e.g., curve 302) approximately constant (e.g., at or near 100%, labeled "1" in per unit scaling of the graph 300 (the max torque (curve 303) can be kept at constant due to fixed max current limit), and the voltage (curve 301) approximately proportional to the motor speed, where T=$\psi$s×is. In the first range 311, the controller 160 can control the motor 104 with 100% per unit flux to achieve torque control proportional to the motor current, and operation and reduced flux levels would require increased current.

In the second range 312 for an induction or synchronous reluctance motor 104, the controller 160 reduces the flux to match volts hertz for a motor rotating above the field weakening point FWP for flying start operation. The field weaking control in the second range 312 allows the voltage (curve 301) to be maintained (e.g., according to the calculated maximum output voltage VoutMax from the maximum output voltage calculation component 171) without exceeding insulation ratings, and the controller 160 advantageously reduces the flux (curve 302) to match the high motor speed (e.g., at 212 in FIG. 2) using the calculated d-axis reference current (e.g., IdRefFilt), with a corresponding reduction in the maximum torque (curve 303). As shown in FIG. 3, the controller 160 reduces the flux 302 by an amount that increases as the measured motor speed (e.g., OmegaOutput in FIG. 1A) further exceeds the field weakening point FWP, for example by a factor of 1/n where n is the per unit motor speed. In one example, the controller 160 implements approximately constant torque control in the first (e.g., normal) range 311 and implements approximately constant power in the second range 312 up to a maximum speed, for example, limited by pull-out torque (e.g., for an induction motor 104). The described examples advantageously mitigate or avoid violations of the maximum output voltage rating of the power conversion system 100 and limitations of the insulation of the motor 104.

Figure 4:
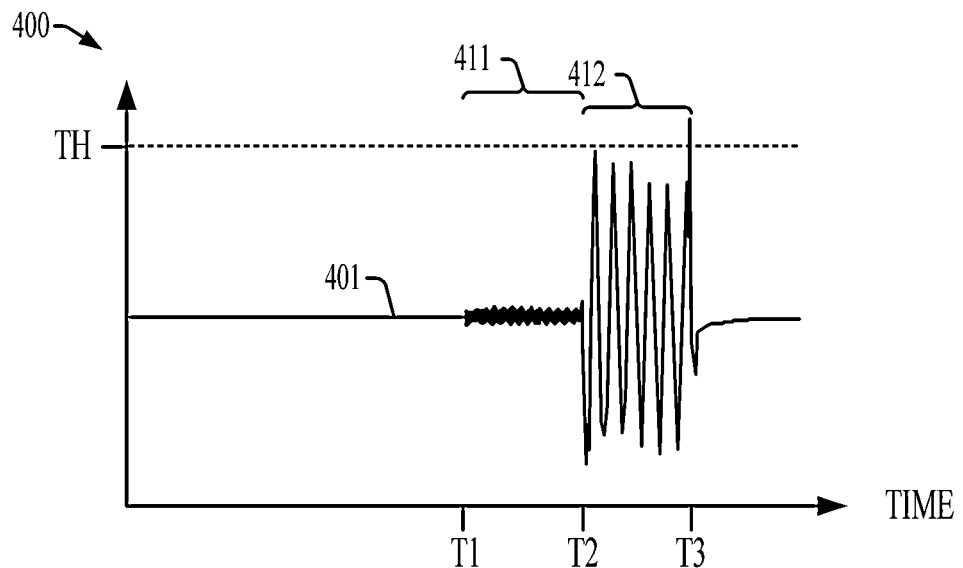
FIG. 4 is a graph.
Figure 5:
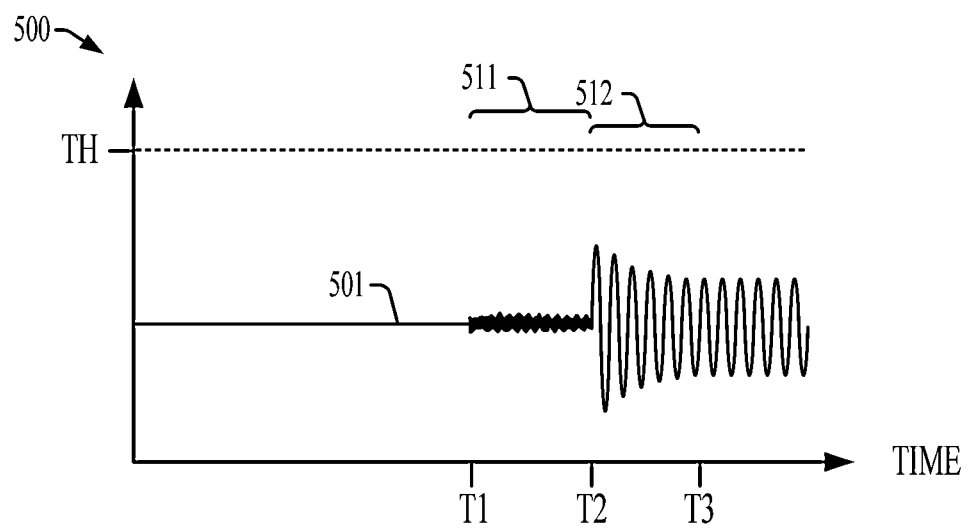
FIG. 5 is a graph.

FIGS. 4 and 5 show respective graphs 400 and 500 that illustrate certain benefits of the controller performance for high speed flying start operation of the system 100. The graph 400 in FIG. 4 shows a motor current curve 401 for an unsuccessful attempted flying start for a synchronous reluctance or induction motor rotating at a speed above the field weakening point FWP when a drive is started. In this example, the motor speed is measured during a measurement period 411 starting at time T1 in FIG. 4. At time T2, the drive transitions to a conventional volts hertz matching period 412, in which no field weakening control is used (e.g., the method 200 of FIG. 2 is not implemented). In this case, the d-axis current is not limited, and the current exceeds a trip threshold TH at time T3, causing the drive to shut down and the attempted flying start fails.

The graph 500 in FIG. 5 shows a motor current curve 501 for a synchronous reluctance or induction motor 104 rotating at a speed above the field weakening point FWP when the drive 100 is started (at 202 in FIG. 2). At time T1 in FIG. 5, the controller 160 measures the motor speed and position (e.g., at 204 in FIG. 2) during a measurement period 511. In this example, the motor speed exceeds the field weakening point FWP, such as a 50 Hz rated motor with a flying motor speed of 60 Hz. The controller 160 calculates the maximum output voltage VoutMax of the inverter 150, for example, by implementing the maximum output voltage calculation component 171 as described above, and the controller 160 calculates the d-axis current reference (e.g., IdRefFilt) at 210 based on the calculated maximum output voltage VoutMax, for example, by implementing the flux current calculation component 180 as described above. At time T2 in FIG. 5, the controller 160 performs the voltage frequency matching control at 212 in FIG. 2 based on the calculated d-axis current reference IdRefFilt in a volts hertz matching period 512. The flux control in the matching period 512 limits the motor current (curve 501) to prevent excursion above the trip threshold TH, and the controller 160 transfers to normal operation at time T3 and thereafter (e.g., 216 in FIG. 2). Normal operation then continues with the controller 160 generating the inverter switching control signals 154 to implement a desired motor control strategy.

Various embodiments have been described with reference to the accompanying drawings. Modifications and changes may be made thereto, and additional embodiments may be implemented, without departing from the broader scope of the invention as set forth in the claims that follow. The specification and drawings are accordingly to be regarded in an illustrative rather than restrictive sense. The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A power conversion system, comprising:
   an inverter configured to convert DC power to AC power to drive a motor; and
   a controller, configured to operate the inverter to perform a flying start operation using field weakening control responsive to a motor speed of the motor exceeding a non-zero threshold at startup of the power conversion system.

2. The power conversion system of claim 1, wherein the non-zero threshold is equal to a rated speed of the motor.

3. The power conversion system of claim 2, wherein the controller is configured to, responsive to the motor speed exceeding the non-zero threshold at the startup of the power conversion system:
   calculate a maximum output voltage of the inverter;
   calculate a d-axis current reference based on the calculated maximum output voltage; and
   perform a flying start operation by field weakening control based on the calculated d-axis current reference.

4. The power conversion system of claim 3, wherein the controller is configured to, responsive to the motor speed exceeding the non-zero threshold at the startup of the power conversion system:
calculate a first d-axis current reference based on the calculated maximum output voltage and a rated d-axis current reference;
determine a second d-axis current reference based on a calculated d-axis flux and a flux map; and
calculate the d-axis current reference based on a smaller one of the first and second d-axis current references.

5. The power conversion system of claim 4, wherein the controller is configured to:
filter the calculated d-axis current reference using a low pass filter to compute a filtered d-axis current reference; and
perform the flying start operation by field weakening control based on the computed filtered d-axis current reference.

6. The power conversion system of claim 1, wherein the controller is configured to, responsive to the motor speed exceeding the non-zero threshold at the startup of the power conversion system:
calculate a maximum output voltage of the inverter;
calculate a d-axis current reference based on the calculated maximum output voltage; and
perform a flying start operation by field weakening control based on the calculated d-axis current reference.

7. The power conversion system of claim 6, wherein the controller is configured to, responsive to the motor speed exceeding the non-zero threshold at the startup of the power conversion system:
calculate a first d-axis current reference based on the calculated maximum output voltage and a rated d-axis current reference;
determine a second d-axis current reference based on a calculated d-axis flux and a flux map; and
calculate the d-axis current reference based on a smaller one of the first and second d-axis current references.

8. The power conversion system of claim 7, wherein the controller is configured to:
filter the calculated d-axis current reference using a low pass filter to compute a filtered d-axis current reference; and
perform the flying start operation by field weakening control based on the computed filtered d-axis current reference.

9. The power conversion system of claim 6, wherein the controller is configured to:
filter the calculated d-axis current reference using a low pass filter to compute a filtered d-axis current reference; and
perform the flying start operation by field weakening control based on the computed filtered d-axis current reference.

10. The power conversion system of claim 1, wherein the motor is an induction motor or a synchronous reluctance motor.

11. A method, comprising:
measuring a motor speed of a motor, responsive to startup of a power conversion system; and
performing a flying start operation using field weakening control to control the motor responsive to the motor speed exceeding a non-zero threshold at startup of the power conversion system.

12. The method of claim 11, wherein the non-zero threshold is equal to a rated speed of the motor.

13. The method of claim 11, wherein performing the flying start operation comprises:
calculating a maximum output voltage of the inverter;
calculating a d-axis current reference based on the calculated maximum output voltage; and
performing a field weakening control based on the calculated d-axis current reference.

14. The method of claim 13, wherein performing the flying start operation comprises:
calculating a first d-axis current reference based on the calculated maximum output voltage and a rated d-axis current reference;
determining a second d-axis current reference based on a calculated d-axis flux and a flux map; and
calculating the d-axis current reference based on a smaller one of the first and second d-axis current references.

15. The method of claim 14, wherein performing the flying start operation comprises:
filtering the calculated d-axis current reference using a low pass filter to compute a filtered d-axis current reference; and
performing a field weakening control based on the computed filtered d-axis current reference.

16. A non-transitory computer readable medium having computer executable instructions which, when executed by a processor, cause the processor to:
measure a motor speed of a motor, responsive to startup of a power conversion system; and
perform a flying start operation using field weakening control to control the motor responsive to the motor speed exceeding a non-zero threshold at startup of the power conversion system.

17. The non-transitory computer readable medium of claim 16, wherein the non-zero threshold is equal to a rated speed of the motor.

18. The non-transitory computer readable medium of claim 16, comprising further computer executable instructions which, when executed by a processor, cause the processor to:
calculate a maximum output voltage of the inverter;
calculate a d-axis current reference based on the calculated maximum output voltage; and
perform a field weakening control based on the calculated d-axis current reference.

19. The non-transitory computer readable medium of claim 18, comprising further computer executable instructions which, when executed by a processor, cause the processor to:
calculate a first d-axis current reference based on the calculated maximum output voltage and a rated d-axis current reference;
determine a second d-axis current reference based on a calculated d-axis flux and a flux map; and
calculate the d-axis current reference based on a smaller one of the first and second d-axis current references.

20. The non-transitory computer readable medium of claim 19, comprising further computer executable instructions which, when executed by a processor, cause the processor to:
filter the calculated d-axis current reference using a low pass filter to compute a filtered d-axis current reference; and
perform the field weakening control based on the computed filtered d-axis current reference.

* * * * *